Patented Sept. 7, 1954

2,688,596

UNITED STATES PATENT OFFICE 2,688,596

LUBRICATING OIL ADDITIVES

Esther M. Deffley, Elizabeth, N. J., assignor to Standard Oil Development Company, a corporation of Delaware No Drawing. Application May 11, 1950, Serial No. 161,483

4 Claims. (Cl. 252—52)

This invention relates to lubricating oil additives and to their method of manufacture. More particularly, this invention relates to a method for the preparation of lubricating oil additives having increased stability characteristics.

It has been known in the art of lubricating oil manufacture that valuable improvements in desirable characteristics of lubricating oils can be obtained by incorporating with a suitable base stock minor percentages of polymers of vinyl ethers and particularly polyvinyl ethers of saturated alcohols. The preparation of these compounds is well described in the patent literature. For instance, U. S. Patent No. 2,061,934, issued to Conradi et al. on November 24, 1936, describes the low temperature polymerization of vinyl isobutyl ether.

These polyvinyl ethers have the desirable characteristic of imparting to the base stocks with which they are blended resistance to viscosity change with changing temperature, a characteristic known to the art as viscosity index improvement.

It has been found subsequently, however, that these polyvinyl ethers, and particularly polyvinyl isobutyl ether, are quite susceptible to shear and thermal breakdown, that is to say, when base stocks containing these polyvinyl ethers are subjected to conditions of high shear and high temperature, there tends to be a decrease in their resistance to viscosity change with temperature change and a consequent loss in viscosity at higher temperatures.

It has now been found that these polyvinyl ether type viscosity index improvers may be stabilized against shear and thermal breakdown by a heating step.

In this stabilizing process the polyvinyl ether, either in the form of the copolymer itself or in an oil concentrate of the copolymer containing from 10% to 99% by weight of the copolymer, is heated to a temperature of from 50° C. to 100° C., preferably 60° C. to 70° C., for a period of time within a range of from 20 to 60 hours, preferably 40 to 50 hours.

Any of the polymerized vinyl ethers having viscosity index improving characteristics, such as polymerized vinyl ethers of saturated alcohols containing from 3 to 12 carbon atoms are improved when subjected to the process of this invention. The preferred embodiment contemplates the heat treating of polyvinyl ethers of saturated alcohols having from 4 to 8 carbon atoms. Particularly operable are the polyvinyl isobutyl ethers having molecular weights ranging from 7,000 to 40,000 Staudinger and of these, those polyvinyl ethers having molecular weights ranging from 20,000 to 35,000 are especially improved.

The polyvinyl ethers are easily prepared by known methods. For example, the monomers can be prepared by reacting acetylene with an appropriate alcohol in the presence of a sodium alcoholate catalyst, and the monomers can be polymerized in the presence of a Friedel-Crafts catalyst, such as $BF_3$, $AlCl_3$, $ZnCl_2$, etc. at a suitable temperature in the range from $-40°$ C. to $+50°$ C.

The following experimental data indicates more specifically the operability of this improved process.

EXAMPLE I

A polyvinyl isobutyl ether, having a molecular weight of about 33,500, prepared according to known procedures, was blended in varying concentrations in a phenol extracted Mid-Continent distillate having a viscosity at 210° F. of 46 S. U. S. and a viscosity index of 112. Inspection tests on these blends point out the viscosity index improving potency of this polymer.

Table I

| Concentration of Active Ingredient | Vis., 25° F., S. U. S. | Vis., 100° F., S. U. S. | Vis., 210° F., S. U. S. | Viscosity Index |
|---|---|---|---|---|
| 0.0% |  | 46.0 |  | 112 |
| 0.5% | 2,313 | 204.7 | 50.0 | 130 |
| 1.0% | 2,906 | 245.7 | 55.8 | 139 |
| 1.5% | 3,619 | 292.1 | 62.4 | 143 |

EXAMPLE II

A 2.0 weight percent blend of the polyvinyl isobutyl ether of Example I was made using as a base stock a blend of Mid-Continent and Coastal distillates, the base stock having a viscosity at 210° F. of 57.2 S. U. S. and a viscosity index of 92. This blend of polymer and oil base was divided into two portions. One portion was submitted to the McIntyre pump test for one hour wherein the polymer oil blend is circulated through the McIntyre gear pump at 200° F. and 1000 p. s. i. g. for one hour. A comparison of the viscosity data on the two portions were then made, the data being reported in Table II below.

*Table II*

|  | Vis., 210° F., S. U. S. | Viscosity Index | Δ Viscosity Index | Breakdown, Percent Loss in Vis., 210° F., S. U. S. |
|---|---|---|---|---|
| Original Sample | 77.9 | 126.0 | ---- | ---- |
| 1 Hour Sample | 73.1 | 120.1 | 5.9 | 23 |

EXAMPLE III

The same polyvinyl isobutyl ether identified in Example I above was blended with a close cut solvent extracted Mid-Continent stock to form a 20 weight percent blend. This oil concentrate of the polyvinyl isobutyl ether was heated in an oven maintained at 65° C. for a period of 48 hours. After the heat treatment was completed, a 2.0 weight percent blend of the concentrate in a blend of Mid-Continent and Coastal distillates having a viscosity at 210 of 57.2 S. U. S. and a viscosity index of 92 was prepared. This 2% blend was divided into two portions. One portion was submitted to the McIntyre pump test as described in Example II above. At the expiration of this test the two portions were again compared and the comparative data reported in Table III below.

*Table III*

|  | Vis., 210° F., S. U. S. | Viscosity Index | Δ Viscosity Index | Breakdown, Percent Loss in Vis., 210° F., S. U. S. |
|---|---|---|---|---|
| Original Sample | 76.9 | 122.6 | ---- | ---- |
| 1 Hour Sample | 74.8 | 121.6 | 1.0 | 10.6 |

A comparison of the data reported in Table II and Table III will show the outstanding improvement in stability obtained by the process of this invention. The percent loss in viscosity at 210° F. was reduced from 23% to 10.6%, the viscosity index differential being reduced from 5.9 to 1.0.

To summarize briefly, this invention relates to an improved lubricating oil additive and to lubricating oils containing such improved additive. Polyvinyl ether type additives are greatly improved in stability by being subjected to a heat treatment.

What is claimed is:

1. A process for the stabilization of polymers of vinyl ethers containing from 3 to 12 saturated carbon atoms which comprises heating a material consisting essentially of an oil solution of said polymer to a temperature within a range of from 50° C. to 100° C. for from 20 to 60 hours said polymer having a molecular weight within the range of from 20,000 to 35,000.

2. A process according to claim 1 wherein said polymer is heated to a temperature from 60° C. to 70° C. for from 20 to 40 hours.

3. A process for the stabilization of polyvinyl isobutyl ether having a molecular weight of about 35,000 which comprises heating a material consisting essentially of an oil solution of said polyether to a temperature within a range from about 50° C. to 100° C. for from 20 to 60 hours.

4. A process for the stabilization of polymers of vinyl ethers containing from about 3 to about 12 saturated carbon atoms, which comprises preparing a mineral oil blend containing about 20% of said polymer and heating said mineral oil blend to a temperature within a range of from about 50° C. to 100° C. for from 20 to 60 hours said polymer having a molecular weight within the range of from 20,000 to 35,000.

References Cited in the file of this patent

UNITED STATES PATENTS

| Number | Name | Date |
|---|---|---|
| 2,020,703 | Schumann et al. | Nov. 12, 1935 |
| 2,020,714 | Wulff et al. | Nov. 12, 1935 |
| 2,085,525 | Simo et al. | June 29, 1937 |
| 2,239,501 | Frolich et al. | Apr. 22, 1941 |
| 2,484,374 | Schildknecht | Sept. 27, 1949 |
| 2,551,467 | Schildknecht | May 1, 1951 |

FOREIGN PATENTS

| Number | Country | Date |
|---|---|---|
| 455,340 | Canada | Mar. 22, 1949 |

OTHER REFERENCES

Schmidt et al., Principles of High-Polymer Theory and Practice, McGraw-Hill, 1948, pages 237 and 239.